United States Patent Office 3,403,079
Patented Sept. 24, 1968

3,403,079
RECOVERY OF ORGANIC LIQUID FROM A CLOSE BOILING ANHYDRIDE BY DISTILLATION IN PRESENCE OF AN ORGANIC ACID
Kenneth L. Olivier, Placentia, Calif., assignor to Union Oil Company of California, Los Angeles, Calif., a corporation of California
No Drawing. Filed Dec. 14, 1964, Ser. No. 418,271
6 Claims. (Cl. 203—38)

ABSTRACT OF THE DISCLOSURE

The invention comprises a method for the separation by distillation of a liquid mixture of the anhydride of a carboxylic acid and an organic liquid having a boiling point substantially the same as the anhydride. The invention comprises the addition of a high-boiling carboxylic acid to the mixture prior to distillation which permits fractionation of the mixture into the acid of the anhydride initially present, a distillate comprising the organic compound free of any contamination of the anhydride and the anhydride of the high-boiling acid. The high-boiling acid added to the mixture forms an anhydride with the resulting hydration of the low-boiling acid anhydride, thereby permitting distillation of the mixture to recover the low-boiling acid as the most volatile distillate.

Description of the invention

This invention relates to the purification by distillation of organic products and in particular relates to a method for the recovery of organic liquids free from contamination by carboxylic acid anhydrides having essentially the same boiling point from a liquid mixture of such organic products and carboxylic acid anhydrides.

In a complete process, this invention relates to the oxidative carbonylation of olefins to unsaturated carboxylic acids in the presence of aliphatic acid anhydrides and to a distillation method for the separation of the unsaturated carboxylic acid. In a specific embodiment, this invention relates to the oxidative carbonylation of ethylene to acrylic acid in a reaction medium comprising acetic anhydride and to the distillative recovery of the acrylic acid from the reaction medium.

The distillation method of this invention comprises recovery of an organic compound from a mixture containing the organic compound together with an acid anhydride having substantially the same boiling point by the addition thereto of a higher boiling carboxylic acid followed by distillation. In the distillation, the low boiling aliphatic acid distills from the mixture and thereafter the desired organic product can be recovered by distillation in relatively pure form, free from contamination by the anhydride of the lower boiling aliphatic acid. The distillation results in formation of the anhydride of the higher boiling acid added to the distillation feed and this material can be distilled or left in the distillaton residue.

The process is illustrated by the following block diagram:

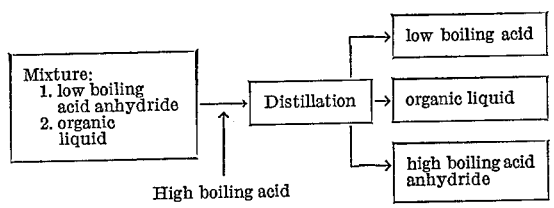

The high boiling acid is chosen having a boiling point of at least about 5° C. greater than the boiling point of the organic product desired to recover as a pure distillate. A sufficient quantity of the high boiling acid is added to the distillation feed to provide at least about 2 mol weights and preferably about 3 to 10 mol weights of said high boiling acid per mol weight of low boiling acid anhydride present in the distillation feed. I have found that the distillation of the mixture proceeds smoothly with substantially all the low boiling acid anhydride transferring to the low boiling acid and an anhydride of the high boiling acid. In this manner, the low boiling aliphatic acid anhydride is eliminated from the distillation feed and the organic product can be separated in a relatively pure state.

The distillation is specifically applied in accordance with my invention to the process for the oxidative carbonylation of olefins to alpha,beta-unsaturated carboxylic acids and beta-acyloxycarboxylic acids described in co-pending application, Ser. No. 371,751. In said application, the oxidative carbonylation is disclosed to comprise contacting an olefin, carbon monoxide and oxygen with an organic solvent containing a platinum group metal and, optionally, a redox agent, under anhydrous conditions. Good yields of the alpha,beta-unsaturated carboxylic acids are obtained. The beta-acyloxycarboxylic acids can be obtained by performing the reaction in an organic solvent comprising a carboxylic acid. In a specific embodiment, it is disclosed that ethylene can be oxidatively carbonylated to acrylic acid and beta-acetoxypropionic acid by contacting, under anhydrous conditions, ethylene, carbon monoxide and oxygen with an acetic acid-acetic anhydride solvent containing a platinum group metal and, optionally, cupric chloride.

While the preceding reaction proceeds quite smoothly to produce high yields of the acrylic acid and beta-acetoxy-propionic acid, some difficulty is experienced in recovering the product. In particular, difficulty is experienced in effecting a good separation between the acrylic acid product and the acetic acid-acetic anhydride mixture by distillation. Acetic anhydride is particularly troublesome in this regard since its boiling point is almost identical with that of acrylic acid. While the preceding recovery problems can be obviated to some degree by the use of a high boiling acid and its anhydride, e.g., use of pivalic acid and pivalic anhydride for the reaction mixture, I have found that in the absence of a low boiling aliphatic carboxylic acid and its anhydride, e.g., acetic acid and acetic anhydride, the rate of reaction is considerably slower. Accordingly, it is desirable to provide a method for the oxidative carbonylation which can be performed in the presence of a low molecular weight aliphatic carboxylic acid and which does not introduce the difficult separation between the acid anhydride and the unsaturated product acid in the product recovery steps.

I have now found that the oxidative carbonylation can be performed at a high conversion rate and the product recovery can be facilitated by performing the oxidation in the presence of a reaction solvent comprising a mixture of a low boiling aliphatic carboxylic acid such as acetic acid, a high boiling carboxylic acid and their anhydrides. The product recovery comprises the aforementioned novel distillation of my invention wherein the low boiling aliphatic carboxylic acid is distilled as the more volatile component and the anhydride of this acid is converted to the anhydride of the high boiling carboxylic acid. This high boiling acid anhydride remains in the distillation residue for recycling to the reaction zone. Surprisingly, the unsaturated product acid can be readily distilled from this mixture without contamination by the anhydride of the low boiling aliphatic acid since all of the anhydride of the low boiling acid present in the reaction mixture apparently converts to the acid and is removed therefrom as this volatile material.

My invention thus also comprises the production of alpha,beta-unsaturated carboxylic acids and/or beta-acyloxy-carboxylic acids by oxidative carbonylation of hydrocarbon olefins in solvents comprising a more volatile carboxylic acid, a higher boiling carboxylic acid and the anhydrides of such acids. In my invention, olefins can be carbonylated with a reaction solvent comprising an aliphatic carboxylic acid and anhydride thereof, said acid having a boiling point that is at least about 5° C. less than the boiling point of the desired alpha,beta-unsaturated carboxylic acid and a carboxylic acid having a boiling point which is at least about 5° C. greater than the boiling point of the unsaturated acid product. Preferably, the more volatile carboxylic acid is present only in minor quantities so as to reduce the necessary amount of overhead distillate produced in distillation of the unsaturated acid.

The olefin oxidized in accordance with my invention can be any hydrocarbon olefin having from 2 to about 12 carbon atoms and having at least one hydrogen bonded to at least one of the olefinic carbons. Examples of useful olefins are the aliphatic hydrocarbon olefins such as ethylene, propylene, butene-1, pentene-1, hexene-1, 2-methylbutene-1, octene-3, 2-propylhexene-1, decene-2, 4,4-dimethylnonene-1, dodecene-1, vinylcyclohexane, allylcyclohexane, styrene, paramethylstyrene, betamethylstyrene, alphamethylstyrene, paravinyl cumene, alphavinylnaphthalene, allylbenzene, cyclobutene, cyclopentene, cyclohexene, methyl-cyclohexene, cycloheptene, etc. Of the aforementioned hydrocarbon olefins, the aliphatic hydrocarbon olefins having from 2 to about 6 carbons are preferred.

The product of the oxidative carbonylation comprises an alpha,beta-unsaturated carboxylic acid having one more carbon than the olefin reactant. Some degree of addition of the aliphatic carboxylic acid to the olefinic bond occurs, and to the extent of this reaction a portion of the product comprises a beta-acyloxy carboxylic acid. The latter product can be readily pyrolyzed to recover the carboxylic acid and a high yield of the alpha,beta-unsaturated carboxylic acid as the product.

As disclosed in the aforementioned copending application, the product acids can be obtained in a continuous fashion by the simultaneous contacting of an olefin, carbon monoxide and oxygen provided the reaction is initiated and maintained under substantially anhydrous conditions. During the reaction, the platinum group metal is reduced from its highest valency state to a lower valency. The reduced state of the metal is then oxidized to a higher valency by contacting of the liquid with oxygen. Preferably, a suitable redox agent is employed to facilitate the oxidation. The overall reaction then is as follows:

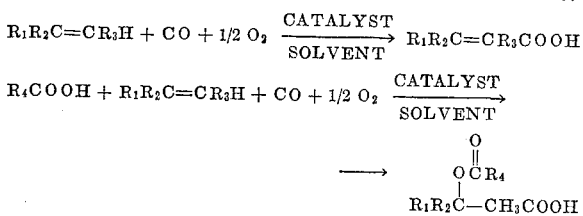

wherein $R_1$, $R_2$ and $R_3$ are hydrogen, alkyl, cycloalkyl or aryl and the olefin has from 2 to about 8 carbons; $R_4$ is alkyl; and the catalyst employed is a platinum group metal with, optionally, quantities of a redox agent.

The reaction is performed under liquid phase conditions with the aforementioned solvent comprising a mixture of a low boiling carboxylic acid, a high boiling carboxylic acid and anhydrides thereof.

The reaction can be performed under relatively mild conditions and exhibits an attractive rate at temperatures from about 30° to about 300° C. and pressures sufficient to maintain liquid phase conditions. Preferably, pressures between atmospheric and about 500 atmospheres or more can be employed; most preferably from about 20 to about 100 atmospheres are used to accelerate the reaction. To maintain the reaction under substantially anhydrous conditions, a suitable dehydrating agent is employed, in particular the acid anhydrides of the carboxylic acids used as the reaction solvent. It is important that the reaction be initiated and maintained under anhydrous conditions, e.g., with reaction solvents containing less than about one weight percent water, to insure that the oxidative carbonylation will occur and that undesired reactions, such as oxidation to carbon dioxide, aldehydes, ketones or unsaturated esters, do not occur.

To initiate the reaction under anhydrous conditions, I prefer to employ the salts, herein specified, in their anhydrous state. It is of course apparent that when hydrated salts are employed, an anhydrous reaction medium can be achieved by elimination of the water, e.g., by volatilization of the water by heating, stripping or distilling, or by reaction of the water with an added dehydrating agent. The distillation can be facilitated in accordance with the skill of the art by use of a suitable water-azeotroping agent such as an aromatic hydrocarbon, e.g., benzene, toluene, etc., alkyl esters, e.g., vinyl acetate, ethyl acetate, methylpropionate, propylbutyrate, etc.

Spurious side reactions such as those which form an unsaturated ester from the olefin, e.g., vinyl acetate from ethylene, or that lead to the formation of carbon dioxide, as well as other side reactions, can result in the formation of water. As previously mentioned, the reaction should be maintained under anhydrous conditions, i.e., preferably in the absence of even slight quantities of water.

Preferably, the slight quantities of water are eliminated from the system by incorporation of a suitable dehydrating agent therein. In particular, the reaction medium should contain the anhydride of the carboxylic acid solvents in quantities such that from 5 to about 75 weight percent of the acids are in the form of their anhydrides, preferably amounts from 10 to about 50 percent of the acids are as the anhydrides.

The reaction solvent thus comprises a mixture of a low boiling, saturated, carboxylic acid, a high boiling carboxylic acid and their anhydrides. The low boiling aliphatic carboxylic acid can be any saturated acid having a boiling point at least about 5° C. less than the product acid and selected from any of the following acids having 1 to about 10 carbon atoms:

| Acid: | Atmospheric boiling points, ° C. |
|---|---|
| Formic | 100.8 |
| Acetic | 118.1 |
| Propionic | 141.4 |
| Butyric | 164.1 |
| Isobutyric | 154.7 |
| Valeric | 186.4 |
| Isovaleric | 176.5 |
| Caproic | 205.4 |
| Isocaproic | 198.0 |
| Oenanthylic | 223.0 |
| Caprylic | 239.3 |
| Isocaprylic | 226.9 |
| Pelargonic | 253.5 |
| Capric | 268.7 |

The high boiling acid is selected so that it or its anhydride has a boiling point at least about 5° C. higher than the boiling point of the alpha,beta-unsaturated acid product. In most instances, the anhydride is higher boiling than the corresponding acid; however, occasionally the anhydride is more volatile and then the high boiling acid is selected so that its anhydride has a boiling point at least 5° C. greater than the boiling point of the product. The acid should be inert to the oxidation and can have any functional groups which are not reactive with the low boiling acid or the reactants. Typical of functional groups which do not interfere with the reaction are halogens and therefore bromo, fluoro, chloro or iodo substituted acids can be used. The high boiling acid can be any alkyl, aryl, cycloalkyl, alkaryl or aralkyl carboxylic acid or halo substituted acid having from about 5 to about 25 carbons. Examples of suitable acids include any of the aforementioned saturated acids having 5 to 10 carbons and their branched chain isomers as well as any of the following acids.

| Acid: | Boiling point, ° C. |
|---|---|
| Pivalic | 164 |
| Bromobutyric | 181 |
| Chloroacetic | 189 |
| Dichloroacetic | 194 |
| Bromoacetic | 208 |
| 2,3-dibromobenzoic | 209 |
| Dibromoacetic | 232 |
| Trichloroacetic (25 mm.) | 120 |
| Benzoic | 250 |
| o-Ethylbenzoic | 259 |
| Phenylacetic | 266 |
| o-Propylbenzoic | 273 |
| Toluic acids | 259–275 |
| Naphthoic | 300 |
| Undecylic (160 mm.) | 228 |
| Lauric (100 mm.) | 225 |
| (Anhydride) | 166 |
| Myristic (100 mm.) | 250.5 |
| (Anhydride) | 198 |
| Palmitic (100 mm.) | 271.5 |
| Margaric (100 mm.) | 227.0 |
| Stearic acid (110 mm.) | 291.0 |
| Nondecylic (110 mm.) | 297 |
| Arachidic | 328 |
| Behenic (60 mm.) | 306 |

The high boiling carboxylic acid should preferably be present in a stoichiometric quantity equivalent to the total of the anhydride in the reaction solvent. To the extent that this acid is present in any amount, it will dehydrate to form the anhydride and decrease the amount of low boiling acid anhydride. When, however, the high boiling acid is present in a sufficient quantity to form as the only anhydride in the solvent, complete elimination of contamination by the anhydride of the low boiling acid is achieved. Preferably this acid comprises the major quantity of the reaction solvent, e.g., from about 45 to about 95 percent of the reaction solvent and the low boiling acid comprises the minor solvent, e.g., from about 5 to about 45 weight percent of the reaction solvent. This is preferred since the low boiling acid is volatilized from the crude reaction product during distillation to recover the oxidized product and must be condensed and recovered for recycling to the reaction zone. From the preceding discussion, it is believed that the selection of the particular carboxylic acids will be obvious to those skilled in the art. The selection of these materials is further exemplified in the succeeding discussion of the invention.

In the aforementioned carbonylation of olefins, a portion (from about 5 to 50 percent) of the reaction medium can also comprise a liquid organic solvent which has a solvency for the catalyst and which is inert to the reaction conditions. Various organic liquids can be employed for this purpose such as sulfoxides, sulfones, amide, ketones, ethers and esters. Illustrative of these materials include the alkyl and aryl sulfoxides and sulfones such as dimethyl sulfoxide, propylethyl sulfoxide, diisopropyl sulfone, decylmethyl sulfoxide, butylamyl sulfone, diisooctyl sulfoxide, diphenyl sulfoxide, methylbenzyl sulfone, etc.

Another class of organic solvents that have sufficient solvency for the catalyst salts and that are inert to the oxidative carbonylation are various amides such as formamide, dimethyl formamide, ethylisopropyl formamide, acetamide, N-phenylacetamide, N,N-dipropylacetamide, iso-butyramide, N-ethylisobutyramide, isovaleric amide, N,N-dimethylisovaleric amide, isocaprylic amide, N,N-di- methyl-n-caprylic amide, N-propyl-n-heptanoic amide, iso-undecylic amide, etc.

Various alkyl and aryl ketones can also be employed as the reaction solvent, e.g., acetone, methylethyl ketone, diethyl ketone, diisopropyl ketone, ethyl-n-butyl ketone, methyl-n-amyl ketone, cyclohexanone, di-iso-butyl ketone, etc.

Ethers can also be employed as the reaction solvent, e.g., di-iso-propyl ether, di-n-butyl ether, ethylene glycol di-iso-butyl ether, methyl o-tolyl ether, ethylene glycol di-butyl ether, di-iso-amyl ether, methyl p-tolyl ether, methyl m-tolyl ether, dichloroethyl ether, ethylene glycol di-iso-amyl ether, diethylene glycol diethyl ether, ethylbenzyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as the solvent, e.g., ethyl formate, methyl acetate, ethyl acetate, n-propyl formate, iso-propyl acetate, ethyl propionate, n-propyl acetate, sec-butyl acetate, iso-butyl acetate, ethyl n-butyrate, n-butyl acetate, iso-amyl acetate, n-amyl acetate, ethyl formate, ethylene glycol diacetate, glycol diformate, cyclohexyl acetate, furfuryl acetate, iso-amyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diiso-amyl phthalate, dimethyl phthalate, diethyl phthalate, benzyl benzoate, n-dibutyl phthalate, etc.

As previously mentioned, the reaction medium should contain catalytic amounts of a platinum group metal. The platinum group metal can be of the palladium sub-group or the platinum sub-group, i.e., palladium, rhodium, or ruthenium or platinum, osmium, rhenium or iridium. While all of these metals are active for the reaction, we prefer palladium because of its demonstrated greater activity. The platinum group metal can be employed in amounts between about 0.001 and about 5 weight percent of the liquid reaction medium; preferably between about 0.04 and about 2.0 weight percent. The platinum group metal can be added to the reaction medium as a finely divided metal, as a soluble salt or as a chelate. Preferably, the metal in its most oxidized form, i.e., as a soluble salt or chelate is introduced into the reaction zone to avoid the formation of undesired quantities of water. Examples of suitable salts are the halides and carboxylates of the metals such as palladium chloride, rhodium acetate, ruthenium bromide, osmium propionate, iridium benzoate, palladium isobutyrate, etc. Examples of suitable chelates are palladium acetylacetonate, and complexes of the platinum group metal ions with such conventional chelating agents as ethylene diamine tetraacetic acid, citric acid, etc.

To increase the rate of oxidation by rendering it more facile to oxidize the reduced form of the platinum metal, we prefer to employ a reaction medium that contains a halogen, i.e., a bromine or chlorine- (preferably a chlorine-) containing compound. The halogen can be added as elemental chlorine or bromine; however, it is preferred to employ less volatile halogen compounds such as alkali metal or ammonium halide, e.g., cesium chloride, potassium bromide, sodium bromate, lithium chlorate; ammonium bromide, ammonium chloride, etc. Also, any of the aforementioned platinum group metals can be added and their halide salts to supply a portion of the bromide or chloride and, when the hereafter mentioned multivalent metal redox salts are employed, these too can be added as the chloride or bromide. Various organic compounds which liberate chlorine, bromine, hydrogen chloride or bromide under the reaction conditions can also be used, such as phosgene, etc. A particularly attractive source of halide comprises the acyl halides which, as previously mentioned, also serve as organic dehydrating agents. Thus, the use of acetyl chloride serves to remove any undesired water and also provides a continuous source of hydrogen chloride, thereby replacing any chloride lost during the reaction by vaporization or side reactions.

In general, sufficient of any of the aforementioned halogen containing compounds can be added to provide between about 0.05 and about 5.0 weight percent free or coordinately bonded or covalently bonded halogen in the reaction zone; preferably concentrations between about 0.1 and about 3.0 weight percent are employed. This amount of halogen is preferably also in excess of the stoichiometric quantity necessary to form the halide of the most oxidized state of platinum group metal, e.g., in excess of two atomic weights of halogen per atomic weight of palladium present. In this manner, a rapid oxidation can be achieved.

As previously mentioned, various redox compounds can optionally be used in the reaction medium to accelerate the rate of reaction. In general, any multivalent metal salt having an oxidation potential higher, i.e., more positive than the platinum metal in the solution, can be used. Typical of such are the soluble salts of the multivalent metal ions such as the carboxylates, e.g., propionates, benzoates, acetates, etc.; nitrates; sulfates; halides, e.g., bromides, chlorides, etc.; of copper, iron, manganese, cobalt, mercury, nickel, cerium, uranium, bismuth, tantalum, chromium, molybdenum, or vanadium. Of these, cupric and ferric salts are preferred and cupric salts are most preferred. In general the multivalent metal ion salt is added to the reaction medium to provide a concentration of the metal therein between about 0.05 and about 10 weight percent; preferably between about 0.1 and about 3.0 weight percent.

Various other oxidizing agents can also be employed to accelerate the rate of reaction. Included in such agents are the nitrogen oxides that function as redox agents similar to those previously described. These nitrogen oxides can be employed as the only redox agent in the reaction medium or they can be employed jointly with one or more of the aforedescribed redox metal salts such as a combination of a nitrogen oxide and a cupric redox agent or ferric redox agent. In general, between about 0.05 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc., can be introduced into contact with the reaction medium during the oxidation to fix the aforementioned nitrogen oxide content therein or soluble nitrate or nitrite salts such as sodium nitrate, lithium nitrate, lithium nitrite, potassium nitrate, cesium nitrate, etc., can be added to the reaction medium.

The process is operated continuously wherein the platinum group metal and redox agent participate in a catalytic manner. In this method, oxygen is introduced together with the olefin and carbon monoxide into contact with the liquid reaction medium. The carbonylation of the olefin and oxidation to the carboxylic acid results in the stoichiometric reduction of the platinum group metal. The introduction of oxygen serves to reoxidize the reduced metal to its more oxidized and active form. This oxidation is known to form a stoichiometric quantity of water. Surprisingly, however, I discovered that so long as I exercised care in initiating the reaction under anhydrous conditions, the water so formed did not promote the more expected but less desired reactions, i.e., formation of an aldehyde or ketone from the olefin or oxidation of carbon monoxide to carbon dioxide, but rather, the water so formed was consumed in formation of the desired acid product so that no accumulation of water resulted during the continuous reaction. Accordingly, in accordance with my discovery, the reaction can be maintained under anhydrous conditions and a continuous preparation of alpha,beta-unsaturated or beta-acyloxycarboxylic acid is achieved without need to continuously add a dehydrating agent or to strip the water from the reaction zone.

The oxygen is introduced into contact with the liquid reaction medium at a rate controlled in response to the oxygen content of the exit gases from the reaction zone. Continuous or intermittent introduction of oxygen can be employed; however, continuous introduction is preferred. Preferably, the rate of oxygen introduction is controlled relative to the olefin and carbon monoxide rates so as to maintain the oxygen content of the exit gases below the explosive concentration, i.e., less than about 10 and preferably less than about 3 volume percent. Under these conditions, the excess gas comprising chiefly the olefin and carbon monoxide can be recycled to the liquid reaction medium. When the olefin is a liquid under the reaction conditions, an inert gas such as nitrogen, air or mixtures of nitrogen and air can be employed to dilute the gas phase and exit gas stream from the reactor and thereby avoid explosive gas compositions.

The carbon monoxide is introduced into contact with the reactants at a sufficient rate to insure that the desired carbonylation occurs. Relative ratios of the carbon monoxide based on the olefin can be from 1:10 to 10:1 molecular units per molecular unit of olefin, preferably ratios from about 1:5 to about 5:1 and most preferably from 1:2 to 3:1 molecular ratios are employed.

The reaction can be performed under relatively mild conditions, e.g., temperatures from about 30° to about 300° C.; preferably from about 90° to about 200° C. are employed. The reaction pressure employed is sufficient to maintain a liquid phase and preferably, when gaseous olefins are employed, super-atmospheric pressures are used to increase the solubility of the olefin in the reaction medium and thereby accelerate the reaction rate. Accordingly, pressures from about atmospheric to about 500 atmospheres or more, preferably elevated pressures from about 20 to about 200 atmospheres are used.

During the oxidation, a portion of the liquid reaction medium can be continuously withdrawn and distilled to recover the desired products from the reaction medium which contains the catalyst salts and which is recycled for further contact to the reaction zone. Preferably, care is exercised to remove any quantities of water from this recycle reaction. The removal of the water from this recycle stream can be facilitated by azeotropic distillation, e.g., by the addition of a suitable water azeotrope forming agent to remove all water in the distillation and/or by the addition of any of the aforementioned organic dehydrating agents to the reaction medium to the recycle stream.

The distillation method of my invention can, in general, be applied to effect the purification of any organic compound from an aliphatic carboxylic acid anhydride having substantially the same boiling point, i.e. within ±3° C. As previously mentioned, the aliphatic carboxylic acid will in general be any aliphatic carboxylic acid having from about 1 to about 10 carbons and the following lists various organic compounds having substantially the same boiling points as these aliphatic carboxylic acid anhydrides. Following the listing of these organic compounds is a listing of various higher boiling acid which can be added to the liquid mixture in at least about two mol weights per mol weight of anhydride to thereby permit distillation of the organic compound free of contamination by the anhydride. Accordingly, the following tabulation illustrates the separation of any of the following organic compounds from the indicated aliphatic carboxylic acid anhydride.

(a) Acetic anhydride — 140 °C.
(1) Organic compounds:
- 4-ethyl heptane — 139
- Allyl isobutyrate — 139–140
- Benzyl fluoride — 139–140
- 2,3-dibromopropene — 140
- 4-pentenenitrile — 140
- n-Butylchlorocarbonate — 140.5
- Alpha, beta-dichloroethyl ethyl ether — 140.5
- Valeronitrile — 141
- Propyl sulfide — 141–142
- Propionic acid — 141.1
- 1,2-dibromopropane — 141.6
- Acrylic acid — 141.9
- Butyl ether — 142
- 1,1,1-triethoxyethane — 142

(2) High boiling acid additive:
- Butyric — 164.1
- Bromobutyric — 181
- Chloroacetic — 189
- Dichloroacetic — 194
- Benzoic — 250
- Toluic — 259–275
- Undecylic (160 mm.) — 228
- Lauric (anhydride) — 166
- Stearic (110 mm.) — 291

(b) Propionic anhydride — 169.3
(1) Organic compound:
- Ethyl trichloroacetate — 168
- Ethyl caproate — 168
- 3-octanone — 168
- Diisobutyl ketone — 168
- 1,3-decadiene — 168
- Dipropyl carbonate — 168.2
- Isobutyl isovalerate — 168.5
- Isoamyl isobutyrate — 168.8
- 3-methyl cyclohexanone — 169
- 4-methyl cyclohexanone — 169
- Succinaldehyde — 169–170
- Isoamyl acetate — 169.2
- Pseudocumene — 169.4
- Methylene acetate — 170
- Methyl acetoacetate — 170

(2) High boiling acid additive:
- Valeric — 186.4
- Isovaleric — 176.5
- Dichloroacetic — 194
- o-Ethylbenzoic — 259
- Phenylacetic — 266
- Myristic (anhydride) — 198
- Palmitic (100 mm.) — 271.5

(c) Butyric anhydride — 198
(1) Organic compound:
- Isodurene — 197
- Benzoyl chloride — 197
- m-Butyl toluene — 197
- p-Butyl toluene — 198
- n-Ethyl formamide — —
- Trichloroacetic acid — 197.5
- n-Octyl formate — 198
- Benzyl bromide — 198
- Isobutyl phenyl ether — 198
- Alpha-bromoisobutyric acid — 198–200
- 3,5-diethyltoluene — 198–200
- Tiglic acid — 198.5
- Ethyl malonate — 198.5
- Chlorostyrene — 199
- m-Tolualdehyde — 199

(2) High boiling acid additive:
- Caproic — 205.4
- Caprylic — 239.3
- Capric — 268.7
- Arachidic — 328
- Naphthoic — 300

(d) Valeric anhydride — 215
(1) Organic compond:
- Methyl pelargonate — 214
- Alpha-trichlorotoluene — 214
- p-Chlorobenzaldehyde — 214
- Isohexylbenzene — 214
- Propyl oxalate — 214
- Isohexylbenzene — 214
- Dodecane — 214.5
- p-Tolyl allyl ether — 214.5
- p-Bromoanisole — 215
- Pelargonyl chloride — 215.4
- Ethyl phosphate — 216
- Isoamyl sulfide — 216
- Isobutyl phenylcarbonate — 216

(2) High boiling acid additive:
- Oenanthylic — 223
- Isocaprylic — 226.9
- Benzoic — 250
- Toluic — 259–275
- Margaric (110 mm.) — 227

(e) Caproic anhydride — 241–243
(1) Organic compound:
- 2-acetyl-p-cymene — 240
- Benzyl butyrate — 240
- Ethylene butyrate — 240
- Ethyl acetylmalonate — 240
- n-Propyl salicylate — 240
- Ethyl isoamyl malonate — 240–245
- Alpha-methylnaphthalene — 241
- o-Xylene dichloride — 241
- 1,2,3-trimethoxybenzene — 241

(2) High boiling acid additive:
- Benzoic — 250–253.5
- Pelargonic — 253.5
- Phenylacetic — 266
- Palmitic (100 mm.) — 271.5
- Stearic (110 mm.) — 291

(f) Caprylic anhydride — 285
(1) Organic compound:
- 1,1-diphenylpropene — 284
- Ethyl m-phthalate — 285
- 2-tridecanone — 285
- p-Benzyltoluene — 285
- 2,6-dichloronaphthalene — 285
- Octyl phenyl ether — 285.2
- 1,7-dichloronaphthalene — 286

(2) High boiling acid additive:
- Nonadecylic — 297
- Arachidic — 328
- Stearic (110 mm.) — 291
- Behenic (60 mm.) — 306

Distillation of the mixture of the organic compound, low boiling acid, high boiling acid and their anhydrides can be effected at any desired pressure from atmospheric to subatmospheric pressures as low as 1–5 mm. mercury pressure. Generally subatmospheric pressures from about 50 mm. to 760 mm. and more commonly from about 100 mm. to about 250 mm. mercury are used. Conventional rectification towers with reflux ratios from about 100:1 to about 1:100 can be used as apparent to those skilled in the art.

For oxidative carbonylation of ethylene to acrylic acid:

The following compositions will illustrate various reaction solvents for the oxidative carbonylation of olefins and selection of high boiling carboxylic acids for addition thereto in accordance with my invention. The anhydride in each example is expressed in mol percent of the acids as the anhydride. These reaction media can be readily prepared by admixing the acids and/or their anhydrides in the proper amounts. The total anhydride can be added in the form of either acid since during distillation the higher boiling acid is converted to its anhydride to permit volatilization of the low boiling acid.

Solvent Composition 1

For oxidative carbonylation of ethylene to acrylic acid:

| | Percent |
|---|---|
| Acetic acid | 20 |
| Pivalic acid | 80 |
| Percent anhydrides | 30 |

Solvent Composition 2

For oxidative carbonylation of ethylene to acrylic acid:

| | Percent |
|---|---|
| Acetic acid | 25 |
| Isobutyric acid | 40 |
| Ethylene glycol dibutyl ether | 35 |
| Percent anhydrides | 15 |

Solvent Composition 3

For oxidative carbonylation of propylene to crotonic and methacrylic acids:

| | Percent |
|---|---|
| Propionic acid | 5 |
| Oenanthylic acid | 75 |
| Isocaprylic amide | 20 |
| Percent anhydrides | 25 |

Solvent Composition 4

For oxidative carbonylation of butene-1 to 2-pentenoic acid:

| | Percent |
|---|---|
| Acetic acid | 10 |
| Capric acid | 90 |
| Percent anhydrides | 30 |

Solvent Composition 5

For oxidative carbonylation of heptene-1 to 2-octenoic acid:

| | Percent |
|---|---|
| Acetic acid | 15 |
| Palmitic acid | 85 |
| Percent anhydrides | 40 |

Solvent Composition 6

For oxidative carbonylation of ethylene to acrylic acid:

| | Percent |
|---|---|
| Acetic acid | 20 |
| Beta-acetoxy propionic acid | 80 |
| Percent anhydrides | 20 |

EXAMPLE 1

A typical crude product from the oxidative carbonylation of ethylene to acrylic acid in an acetic acid-pivalic acid solvent was distilled in a 30-plate Oldershaw column at 22–26 mm. Hg pressure and a reflux ratio of 7:3. One gram of hydroquinone and one gram of copper metal were added to the distillation flask to inhibit polymerization of the acrylic acid. The crude product had the following composition:

| Component: | Grams |
|---|---|
| Acetic acid | 55 |
| Anhydride (calculated as acetic) | 100 |
| Acrylic acid | 100 |
| Pivalic acid | 200 |

The following distillates and residue were obtained:

| Distillate | Boiling point (° C.) | Composition (grams) |
|---|---|---|
| 1 | 34 | 70 acetic acid. |
| 2 | 33 | 32 acetic acid. |
| 3 | 33 | 50 acetic acid. |
| 4 | 34–54 | 26 acetic/25 acrylic. |
| 5 | 55–57 | 41 acrylic. |
| 6 | 58–76 | 23 acrylic/21 pivalic, 6 pivalic anhydride. |
| Residue | | 150 pivalic anhydride. |

When a mixture containing the same amounts of acetic acid, acetic anhydride and acrylic acid (but no pivalic acid) is distilled, the acrylic acid cannot be separated from acetic anhydride.

EXAMPLE 2

To a one-gallon autoclave were charged 450 grams pivalic acid, 50 grams acetic acid, 50 grams acetic anhydride, 1 gram palladium chloride, 5 grams lithium chloride and 5 grams cupric chloride dihydrate. The autoclave was pressured to 300 p.s.i.g. with ethylene and then to 900 p.s.i.g. with carbon monoxide. The mixture was heated to 300° F. and oxygen and nitrogen were slowly added during a thirty-minute period. The reaction product was distilled under vacuum in a similar method to that of Example 1 to recover 5 grams acrylic acid and 41 grams beta-acetoxypropionic acid.

The experiment was repeated with a reaction solvent comprising 50 grams of pivalic anhydride and 500 grams of pivalic acid. The crude product was distilled to recover 3.5 grams acrylic acid.

The experiment was repeated with a solvent comprising 61 grams of cyclohexane carboxylic anhydride and 485 grams of cyclohexane carboxylic acid. Distillation of the crude oxidate yielded some acrylic acid.

EXAMPLE 3

To a one-gallon autoclave were charged 800 grams pivalic acid, 150 grams acetic anhydride, 50 grams acetic acid, 1 gram palladium chloride, 5 grams lithium chloride, 3 grams lithium acetate and 5 grams cupric chloride dihydrate. The mixture was analyzed for total anhydride and found to contain 133 grams calculated as acetic anhydride. The autoclave was pressured to 450 p.s.i.g. with ethylene, then to 900 p.s.i.g. with carbon monoxide and heated to 280° F. Oxygen was added in 20 p.s.i. increments during a twenty-minute period while nitrogen was added to maintain a constant pressure.

The autoclave was cooled and depressured and the liquid products analyzed for anhydride. The total anhydride present in the product was 42 grams calculated as acetic anhydride. A 606-gram fraction of the crude product was distilled in a 30-plate Oldershaw column at 24 mm. mercury pressure and a reflux ratio of 85 parts per 15 parts distillate. The following distillates were obtained:

| Distillate | Boiling range (° C.) | Composition |
|---|---|---|
| 1 | 31–35 | 62 grams acetic acid. |
| 2 | 35.5–57 | 40 grams acetic acid/2 grams unidentified. |
| 3 | 57–75 | 22 grams acrylic/22 grams pivalic, 4 grams unidentified. |
| 4 | 75 | 6 grams acrylic/31 grams pivalic. |
| 5 | 75–78 | 8 grams acrylic/60 grams pivalic. |
| 6 | 78–81 | 262 grams pivalic. |
| Residue | | 71 grams. |

The preceding examples are intended solely to illustrate a mode of practice of my invention and to demonstrate results obtainable thereby. It is not intended that the examples be unduly limiting of the invention which is intended to be defined by the steps and their equivalents set forth in the following claims.

I claim:

1. In the distillation of a liquid mixture of an anhydride of a first aliphatic carboxylic acid and an organic liquid inert thereto and having substantially the same boiling point as said anhydride, the improved method for obtaining said organic liquid in high purity and substantially free of contamination from said anhydride that comprises: admixing with said liquid mixture a second carboxylic acid having a boiling point at least 5° C. greater than said organic product in an amount sufficient to furnish at least two mols of said second acid per mol of said anhydride and thereafter distilling said liquid mixture to remove the first aliphatic carboxylic acid as the most volatile component and to recover said organic liquid as a distillate in a pure state free of said first aliphatic acid anhydride.

2. The distillation of claim 1 wherein, said first aliphatic carboxylic acid anhydride is acetic anhydride and said organic liquid has an atmospheric boiling point of from 137° to 143° C.

3. The distillation of claim 1 performed at subatmospheric pressure.

4. In the distillation of a mixture of a first carboxylic acid, the anhydride of said first acid and an inert organic liquid having substantially the same boiling point as said anhydride of said first carboxylic acid, the improved method for separating said organic liquid free of the inhydride of said first acid that comprises: admixing with said mixture a second carboxylic acid having an atmospheric boiling point of at least 5° C. greater than the boiling point of said organic liquid in an amount sufficient to furnish at least two mols of said second carboxylic acid per mol of said anhydride and thereafter distilling the mixture to separate said first carboxylic acid as the most volatile component and to recover said organic liquid as a distillate free of contamination of the anhydride of said first carboxylic acid.

5. The distillation of claim 1 wherein said first acid is acetic acid and said organic liquid is acrylic acid.

6. The distillation of claim 4 performed at subatmospheric pressure.

References Cited

UNITED STATES PATENTS

| | | | |
|---|---|---|---|
| 2,249,527 | 7/1941 | Hull | 203—61 |
| 2,703,309 | 3/1955 | Painter | 203—38 |
| 2,770,585 | 11/1956 | Smith | 203—38 |
| 2,936,267 | 5/1960 | Fernholz et al. | 203—61 |
| 3,106,577 | 10/1963 | Ciocchetti | 260—533 |

WILBUR L. BASCOMB, JR., *Primary Examiner.*